United States Patent Office 3,033,802
Patented May 8, 1962

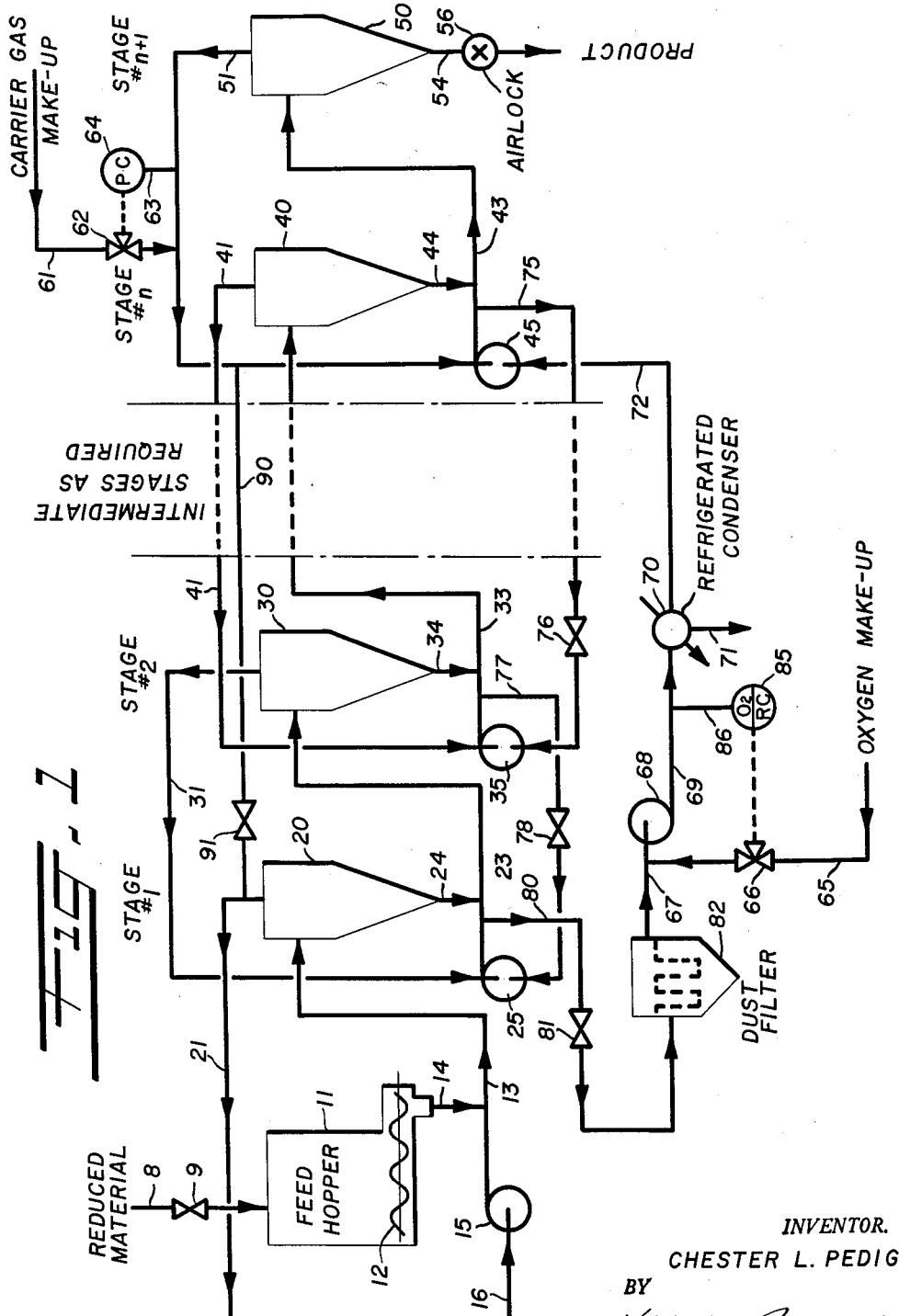
May 8, 1962     C. L. PEDIGO     3,033,802
STABILIZATION OF REDUCED METAL CATALYST AND APPARATUS THEREFOR
Filed May 22, 1959     2 Sheets-Sheet 1
INVENTOR.
CHESTER L. PEDIGO
BY
*Mason, Kolehmainen, Rathburn & Wyss*
ATTORNEYS

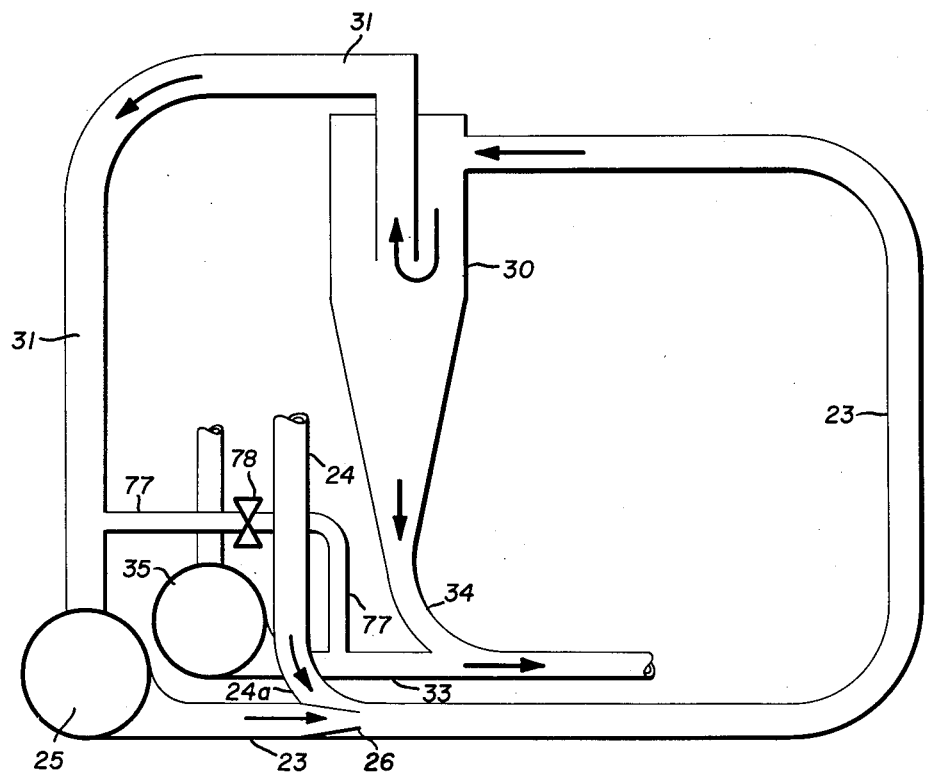

3,033,802
STABILIZATION OF REDUCED METAL CATALYST
AND APPARATUS THEREFOR
Chester L. Pedigo, Louisville, Ky., assignor to Chemetron Corporation, Chicago, Ill., a corporation of Delaware
Filed May 22, 1959, Ser. No. 815,064
13 Claims. (Cl. 252—472)

This invention relates to an improved method of stabilizing a finely divided reduced metal catalyst. More particularly, this invention relates to a method of rendering a finely divided reduced nickel catalyst non-pyrophoric by entrainment in a stream of non-oxidizing gas containing therein a controlled quantity of oxygen. Catalysts produced by the method of the present invention are active hydrogenation catalysts which are stable to the atmosphere and easy to handle safely.

Reduced metal catalysts, particularly of metals such as nickel and cobalt, are well known to the art and a variety of conventional methods exist for producing them. In one such process a basic carbonate of a metal, such as nickel, is prepared by precipitation of a carbonate from a solution of a salt of the metal and then the precipitated basic carbonate of the metal is subjected to a reducing atmosphere at elevated temperature to decompose the metal carbonate to produce a metal oxide which is then reduced to a metal in the form of an active catalyst. Frequently the carbonate of the metal is precipitated on a carrier, such as kieselguhr, so that the metal oxide is spread over the surface of such carrier.

The finely divided reduced metal catalysts produced in accordance with the procedures of the prior art are subject to the great disadvantage that they are pyrophoric, that is, when exposed to atmospheric oxygen they oxidize very rapidly and often take fire. The excessive heat produced on exposure of such catalyst to the atmosphere is undesirable both because it makes the catalysts hazardous to handle and because it reduces or destroys the catalytic properties of the catalysts. Hence it is the usual practice to protect an active reduced metal catalyst against atmospheric oxygen following the reduction step or to stabilize the catalyst with respect to such oxygen.

According to one prior procedure, stabilization of nickel catalysts may be effected by flushing the reduction unit with nitrogen at the end of the reduction step (wherein nickel oxide is reduced to nickel), cooling the catalyst bed to approximately room temperature, and introducing a small quantity of oxygen into the nitrogen atmosphere in contact with the catalyst bed. A controlled oxidation of the hydrogen adsorbed on the metal catalyst takes place with a moderate evolution of heat, and the oxygen concentration of the atmosphere is gradually increased at a controlled rate until the hydrogen is consumed and the metal catalyst is stabilized towards atmospheric oxygen.

It has been found, however, that in the controlled oxidation of reduced metal catalysts to stabilize them against the atmosphere there is frequently localized overheating or "hot spotting" in the catalyst bed which not only damages the catalyst but substantially increases the time required for the stabilization process. Furthermore, it is frequently the case that the catalysts stabilized by prior art procedures is not uniform in activity and stability, and often may be pyrophoric in sections while stabilized in other sections. The disadvantages of "hot spotting" and lack of uniformity of stabilization are obvious and render the prior art methods of stabilization sufficiently inefficient and unreliable to preclude commercial acceptance.

It is an object of this invention to provide a method of effectively stabilizing reduced metal catalysts against atmospheric oxygen by an efficient controlled oxidation procedure. It is a further object of this invention to provide continuous apparatus for such stabilization method. It is another object of the invention to provide a method of stabilizing a reduced metal catalyst to produce a uniform product of high catalytic activity and stability. It is a further object of this invention to provide a method of stabilizing a reduced metal catalyst with respect to atmospheric oxygen in a short period of time in a continuous system. It is another object of this invention to provide a method of stabilizing a catalyst which eliminates hot spots in the catalyst during stabilization. These and other objects of the invention are apparent from and are achieved in accordance with the following disclosure.

The invention is more readily understood by reference to the following description taken in conjunction with the accompanying drawings in which:

FIG. 1 is a flow diagram showing apparatus and method for stabilizing a reduced metal catalyst in accordance with this invention; and FIG. 2 is a diagrammatic perspective representation, showing one complete stage or cycle of the apparatus for stabilizing a reduced metal catalyst.

I have discovered a method of stabilizing a reduced metal catalyst wherein the catalyst is entrained in a carrier stream of non-oxidizing gas and controlled quantities of oxygen or oxygen-containing gas, such as air, are introduced into the entrained stream of gas and catalyst. The oxygen oxidizes, at a moderate but highly effective rate, the hydrogen adsorbed on the surface of the reduced metal catalyst and thereby removes the hydrogen from the catalyst in the form of water vapor, thus stabilizing the catalysts and rendering it non-pyrophoric when exposed to the atmosphere. The stream of catalyst entrained in carrier gas passes through a separator, such as a cyclone, where the gas is separated from the catalyst and the latter can be introduced into another carrier stream of non-oxidizing gas containing a higher concentration of oxygen to produce further oxidation of the hydrogen adsorbed on the catalyst. This carrier stream with entrained catalyst passes to a second separator where the solid catalyst and the gas stream are separated and the procedure can be continued through an additional number of stages, each employing a higher concentration of oxygen, until a catalyst is produced which is stable to a gas stream containing 10% to 25% oxygen, at which point the gas is separated from the catalyst by a final separator, such as a cyclone, and the catalyst is collected and packaged for commercial use. By such continuous gas entrainment procedure the catalyst is rapidly and efficiently exposed to controlled amounts of oxygen in a non-oxidizing atmosphere and rapidly stabilized at relatively low temperature. In commercial operation a batch of catalyst is entrained in the stream of carrier gas and oxygen for a total period of about less than one minute to produce a highly stable yet highly active reduced metal catalyst.

The procedure described above can be conducted in a series of stages or cycles, each having individual gas streams wherein the oxygen concentration of the gas is controlled so that the first gas stream in which the catalyst is entrained has a low concentration of oxygen and the subsequent gas streams have successively higher concentrations of oxygen until the last stream contains approximately the same concentration of oxygen as does the atmosphere. The procedure can also be carried out in one stage or cycle wherein the catalyst is entrained in a stream of carrier gas to which is added a small concentration of oxygen. As the catalyst and gas stream move through the apparatus additional controlled quantities of oxygen can be fed into the gas stream at a plurality of points to progressively increase the oxygen concentration of the gas stream. In this way the oxygen concentration of the gas stream can be raised in one cycle or stage to a value approximating that of air, and the stabilized catalyst can then be separated from the gas stream and collected in non-pyrophoric form.

The carrier gas is preferably carbon dioxide, but other non-oxidizing gases such as nitrogen, rare gases and water vapor can be used. The oxygen which is added to the carrier gas stream can be in the form of pure oxygen, mixtures of oxygen and carbon dioxide or nitrogen, or it can be air. Pure oxygen is preferred because it does not increase the total volume of gas as do air and other gas mixtures.

Referring now to FIG. 1 of the drawings, a reduced metal catalyst is carried in a stream of reducing gas from the catalyst manufacturing operation to a feed hopper 11 which contains an atmosphere of reducing gas to protect the active reduced metal catalyst from oxidation. The reduced metal catalyst is fed by a screw conveyor 12 near the bottom of the hopper 11 through a pipeline 14 which connects with a pipeline 13 attached to the outlet of a rotary centrifugal blower 15. The inlet to the blower 15 is connected to a line 16 leading to a carrier gas supply line 90, through which non-oxidizing gases such as carbon dioxide, nitrogen, flue gas or mixtures thereof are supplied to the system. As a safety measure no oxygen is supplied ordinarily to line 16, although traces may be present due to leakage. The gas stream from the blower 15 entrains the catalyst which enters via line 14 and the gas and entrained catalyst pass through line 13 and enter a cyclone 20 near the top thereof. In the cyclone 20 the gas and entrained solids are separated, the gas passing out of the top of the cyclone via a line 21 which connects to line 16 attached to the blower 15. The catalyst settles to the bottom of the cyclone 20 and is removed via a line 24 which connects to a line 23 attached to a blower 25. The catalyst is entrained and conducted in the stream of carrier gas and oxygen in line 23 to the top of another cyclone 30 where again the catalyst and gas are separated, the gas passing out of the top of the cyclone 30 via a line 31 which leads to the inlet side of the blower 25. The catalyst in cyclone 30 descends to the bottom thereof and is removed via a line 34 which connects to a line 33 carrying a stream of gas produced by a blower 35. The stream of carrier gas and oxygen with entrained catalyst passes through line 33 to the top of the next cyclone and the gas which is separated therefrom returns via a line 41 which connects to the inlet side of the blower 35. There may be a number of intermediate stages of cyclones in the operation. The catalyst and carrier gas stream finally are passed into a pentultimate cyclone 40 in which the gas is separated and returned via line 41 and the catalyst flows into a line 44 connected to a carrier gas and oxygen line 43 attached to the outlet of a blower 45.

The carrier gas and oxygen carry the entrained catalyst in the line 43 to a final cyclone 50 where the catalyst is separated from the gas and collected. The gas is returned to the system via a line 51 which connects to the inlet of the blower 45. The stabilized catalyst which collects near the bottom of the cyclone 50 is removed via a line 54 and an airlock 56 and is packaged for storage and commercial use.

Carrier gas is supplied to the system via a line 61 and a pressure control valve 62 which is regulated by a pressure controller 64, connected to the line 51 by a line 63, which is responsive to the pressure in line 51. The control valve 62 is ordinarily set for a system pressure slightly greater than atmospheric. Part of the carrier gas passes via a line 90 and a valve 91 to line 21 where it enters the first stage of the system. The rest of the carrier gas passes via line 51 to the blower 45 where it enters the last stage of the system.

It will be seen that the gas stream from the top of one cyclone passes to the blower attached to the bottom of the previous cyclone and the bulk of the gas is recircled in its individual cycle. Part of the gas from one cycle is led off to the preceding cycle. Oxygen is fed into the system via a line 65 connected to a supply of oxygen which passes via a control valve 66 to a line 67 attached to the inlet side of a blower 68. The blower 68 displaces carrier gas in the line 67 and the oxygen introduced thereto via a line 69 to a refrigerated condenser 70 where water vapor is removed by condensation through a line 71. The dried carrier gas containing a controlled amount of oxygen then passes via a line 72 to the inlet side of the blower 45 where it enters the system through the line 43. Part of the gas in the line 43 is removed via a line 75 which connects to the blower 35 of the upstream cycle. This line 75 conducts a controlled quantity of carrier gas and oxygen via a regulator valve 76 to the inlet side of the blower 35, where it enters the gas stream through a line 33. A second feed back line 77 conducts part of the carrier gas and oxygen via a control valve 78 to the inlet side of the blower 25. The oxygen and carrier gas entering the blower 15 via the line 77 enters the system through line 23 and part of this oxygen and carrier gas is again displaced via another line 80 and a control valve 81 which leads to the dust filter 82 wherein traces of entrained catalyst are removed and the carrier gas is purified for cycling to the blower 68 via the line 67. An oxygen analyzer 85 is connected to the line 69 via a line 86 and makeup oxygen is introduced to the system via a line 65 through the feed control valve 66 controlled by analyzer 85.

In the operation of the method and apparatus of this invention a supply of pyrophoric reduced metal catalyst is supplied to the feed hopper 11 via an inlet line 8 and a control valve 9 connected thereto in a carrier stream of reducing gas. The catalyst contained in the feed hopper 11 under an atmosphere of reducing gas is fed to the system via a screw feed 12 which forces the reduced metal catalyst via a line 14 into the carrier gas stream in line 13. This carrier gas stream contains only traces of oxygen. The entrained catalyst in the carrier gas is partially stabilized by controlled oxidation as it passes via the line 13 to the cyclone 20 where the gas and catalyst are separated. The partially oxidized and stabilized catalyst collects in the bottom of the cyclone 20 and passes via a line 24 to a second carrier gas stream in line 23 where further oxidation takes place. The carrier gas stream in line 23 contains a higher concentration (about 2% by volume) of oxygen than that in line 13, thereby conducting stabilization to a further state of completion.

The partially stabilized catalyst and gas are separated in cyclone 30 and the catalyst passes via a line 34 into a carrier gas stream in line 33 where it is contacted with an increased concentration of oxygen, thereby further extending the stabilization and partial oxidation of the catalyst. This is continued until the catalyst is separated from the carrier gas in the pentultimate cyclone 40 where the catalyst is collected and passes via a line 44 into the final carrier gas stream 43 having the highest concentration (12% to 25%) of oxygen therein. The catalyst is fully stabilized as it passes into a final cyclone 50 where it is separated from the carrier gas and oxygen and passed through line 54 and air lock 56 into suitable packages for storage and shipment.

FIG. 2 of the drawings illustrates a complete stage or cycle of the apparatus shown in FIG. 1. A stream of entrained catalyst in carrier gas is fed into the apparatus by way of a line 24, which is constructed of pipe or tubing about 3 inches in internal diameter. Line 24 joins line 23 by a joint 24a which curves gently to join line 23 in the direction of gas flow. Line 23 is connected to the outlet end of a rotary centrifugal blower 25 which forces a gas stream through line 23 at high velocity into the top of a cyclone 30. A venturi-type nozzle 26 in the line 23 assists in entraining the catalyst. The cyclone 30 causes the separation of the catalyst and the gas stream, the catalyst descending to a line 34 which connects to a line 33 connected to a blower 35. The catalyst from the cyclone 30 is entrained in the gas stream in line 33 and passes on to another cyclone (not shown) in the next stage or cycle. The gas stream in the cyclone 30 is separated from the catalyst and passes upward through line 31 and back to the blower 25 where it is recycled. It is seen that the catalyst passes onward to the next stage or cycle via line 33 while the gas stream is recycled in the same stage or cycle. A small amount of gas is fed countercurrent from one stage or cycle to the preceding one by a line 77 which connects lines 33 and 31. The gas in line 33 is richer in oxygen than that in line 31 and by controlling the flow of gas in line 77 by means of a control valve 78, the oxygen content of the gas entering the blower 25 can be regulated to an appropriate value.

In a typical operation on a commercial scale, 300 pounds of reduced nickel on kieselguhr catalyst of —325 mesh (90% of the particles are 45 microns or smaller) is passed each hour into the hopper 11 and fed into the system via the screw feed 12 and the line 14. Each of the blowers 15, 25, 35 and 45 has a capacity of 260 standard cubic feet per minute and the catalyst passes from the hopper 11 to the air lock 56 in less than 1 minute.

It will be seen that the catalyst passes countercurrent to the oxygen supply, that is, the catalyst passes from first cycle in line 13 and cyclone 20 to the last cycle in line 43 and cyclone 50, whereas the oxygen passes from line 43 and cyclone 50 to line 13 and cyclone 20, countercurrent to the flow of the catalyst, with the highest concentration being in the line 43 and the lowest concentration being in the cyclone 20. The oxygen makeup introduced into the line 69 is so controlled that the concentration of oxygen as it leaves the blower 68 is between 10 and 15% of the volume of the gas stream, although values in the range of 15 to 25% are also satisfactory. The carrier gas and oxygen which passes through the refrigerator 70 is dehydrated to a dew point of about 35 to 40° F.

The temperature of the stabilization procedure may be controlled by controlling the rate of introduction of oxygen into the system or the rate of introduction of catalyst into the system. Ordinarily it is preferred that the concentration of the oxygen in the first cycle or stage of the system not exceed 2% by volume and the temperature of the circulating gas shall not exceed a value about 20% higher than ambient temperature.

The method of stabilizing reduced metal catalyst as described in this application has the substantial advantage over the prior art methods that the catalyst is entrained in the carrier gas and intimately contacted with oxygen for short periods of time while so entrained. This produces a thorough contact of stabilizing gas with the catalyst through the high gas-to-catalyst ratio which is set up in the system. All material is assured of contact with stabilizing gas due to turbulence in the entrainment and the multiple stage system. The degree of stabilization may be controlled through control of the temperature of circulating gas or through the control of the amount of oxygen introduced in relation to the amount of metal introduced in a given period of time. The system is one of continuous operation and can produce large quantities of stabilized catalyst throughout a twenty-four hour day.

What is claimed as new and is desired to be secured by Letters Patent of the United States is:

1. A method of stabilizing a pyrophoric reduced metal catalyst against atmospheric oxidation, which comprises entraining said reduced metal catalyst in a stream of non-oxidizing carrier gas, introducing a stream of gas containing a controlled quantity of oxygen into said carrier gas stream, subsequently introducing further quantities of oxygen into said carrier gas to produce progressively higher concentrations of oxygen in said carrier gas until said reduced metal catalyst is stabilized against oxidation by gaseous oxygen, and separating said catalyst from said carrier gas.

2. The method of claim 1 wherein the pyrophoric reduced metal catalyst is a nickel catalyst.

3. The method of claim 2 wherein the oxygen concentration in the carrier gas after the first addition of oxygen thereto is not greater than about 2% by volume.

4. The method of claim 3 wherein the rate of oxidation is so controlled that the temperature does not exceed about 20° F. greater than ambient temperature.

5. A method of stabilizing a pyrophoric reduced metal catalyst obtained by the reduction of a metal oxide with hydrogen, which comprises entraining the reduced metal catalyst in a first stream of non-oxidizing gas containing a controlled concentration of oxygen, passing said first stream of gas containing entrained catalyst to a separator where the catalyst is separated from the gas stream, recycling the first gas stream with added makeup oxygen equivalent to that consumed by the catalyst and the hydrogen adsorbed thereon, entraining the catalyst from the separator in a second stream of non-oxidizing gas containing a controlled but higher concentration of oxygen than the first gas stream, and continuing the treatment of the catalyst with gas streams of non-oxidizing gas containing successively higher concentrations of oxygen until the catalyst is stabilized against atmospheric oxygen.

6. The method of claim 5 wherein the pyrophoric reduced metal catalyst is a nickel catalyst.

7. The method of claim 6 wherein the oxygen concentration in the first gas stream is not greater than about 2% by volume.

8. The method of claim 7 wherein the non-oxidizing gas is carbon dioxide.

9. The method of claim 8 wherein the rate of addition of pyrophoric reduced metal catalyst to the first gas stream is controlled such that the temperatures of the first and successive gas streams bearing entrained catalyst are not greater than about 120° F.

10. The method of claim 9 wherein the pyrophoric reduced metal catalyst is exposed to the gas stream of non-oxidizing gas containing controlled concentrations of oxygen for a period of time not greater than about 1 minute.

11. A method of stabilizing a pyrophoric nickel catalyst supported on an inert carrier and produced by the reduction of nickel oxide on said carrier with hydrogen, which comprises feeding said nickel catalyst into a first gas stream of carbon dioxide containing at least 0.5% and not more than about 2% oxygen by volume, entraining said catalyst in said gas stream for 3 to 10 seconds at a temperature in the range of 70° to 120° F., separating the catalyst from the first gas stream and feeding it into a second gas stream containing about 2% to 5% oxygen by volume, entraining said catalyst in said second gas stream for 3 to 10 seconds at a temperature in the range of 70° to 120° F., separating the catalyst from the gas stream, and continuing the entrainment of the catalyst in successive gas streams of carbon dioxide with increasing concentrations of oxygen, followed by separation therefrom, until the catalyst is stabilized against atmospheric oxygen.

12. Apparatus for stabilizing a pyrophoric reduced metal catalyst against atmospheric oxidation, which comprises the combination of means for producing a gas stream of velocity adequate to entrain said catalyst, tubular means forming a closed path for said gas stream, means for introducing said catalyst into said gas stream at a rate such that the catalyst is entrained in said gas stream, means for introducing oxygen into said gas stream at a plurality of points to produce progressively higher oxygen concentrations in said gas stream, and means for separating the catalyst from said gas stream.

13. Apparatus for stabilizing a pyrophoric reduced metal catalyst which comprises the combination of means for producing a first gas stream of velocity adequate to entrain said catalyst, means for feeding said catalyst into said first gas stream at a controlled rate such that the catalyst is entrained in said gas stream, means for separating said catalyst from said first gas stream, means for recycling said first gas stream, means for producing a second gas stream of velocity adequate to entrain said catalyst, means for feeding said catalyst, after separation from said first gas stream, into said second gas stream at a rate such that the catalyst is entrained in said gas stream, means for separating said catalyst from said second gas stream, means for recycling said second gas stream, and means for supplying controlled amounts of oxygen to said first and second gas streams.

References Cited in the file of this patent

UNITED STATES PATENTS

| | | |
|---|---|---|
| 2,677,668 | Ahlberg | May 4, 1954 |
| 2,677,669 | Ahlberg | May 4, 1954 |